(12) United States Patent
Borel et al.

(10) Patent No.: US 10,791,314 B2
(45) Date of Patent: *Sep. 29, 2020

(54) 3D DISPARITY MAPS

(75) Inventors: Thierry Borel, La Bouexiere (FR);
Ralf Ostermann, Hannover (DE);
Wolfram Putzke-Roeming, Hildesheim (DE)

(73) Assignee: InterDigital CE Patent Holdings, SAS, Paris (FR)

( * ) Notice: Subject to any disclaimer, the term of this patent is extended or adjusted under 35 U.S.C. 154(b) by 788 days.

This patent is subject to a terminal disclaimer.

(21) Appl. No.: 13/637,961

(22) PCT Filed: Mar. 31, 2011

(86) PCT No.: PCT/IB2011/000708
§ 371 (c)(1),
(2), (4) Date: Sep. 27, 2012

(87) PCT Pub. No.: WO2011/121437
PCT Pub. Date: Oct. 6, 2011

(65) Prior Publication Data
US 2013/0010057 A1 Jan. 10, 2013

Related U.S. Application Data

(60) Provisional application No. 61/397,418, filed on Jun. 11, 2010, provisional application No. 61/319,566, filed on Mar. 31, 2010.

(51) Int. Cl.
*H04N 13/128* (2018.01)

(52) U.S. Cl.
CPC ............... *H04N 13/128* (2018.05)

(58) Field of Classification Search
None
See application file for complete search history.

(56) References Cited

U.S. PATENT DOCUMENTS

| 5,025,325 A | 6/1991 | Hudson |
| 5,926,567 A * | 7/1999 | Collins ................. G06T 11/203 |
| | | 345/428 |

(Continued)

FOREIGN PATENT DOCUMENTS

| CN | 1153362 | 7/1997 |
| CN | 1132123 | 12/2003 |

(Continued)

OTHER PUBLICATIONS

Curtin et al., "Pixels and Screen Display", A Short Course Book, Sensors, Pixels and Image Sizes, Jan. 12, 2006, www.shortcourses.com/sensors/sensors1-11.html (Year: 2006).*

(Continued)

*Primary Examiner* — Stuart D Bennett
(74) *Attorney, Agent, or Firm* — Invention Mine LLC

(57) ABSTRACT

A particular implementation accesses a disparity value for a particular location in a picture, the disparity value indicating disparity with respect to a particular resolution. The particular implementation modifies the accessed disparity value based on multiple resolutions to produce a modified disparity value. Another implementation accesses a disparity value for a particular location in a picture, the picture having a particular resolution, and the disparity value indicating disparity with respect to another resolution that is different from the particular resolution and that is based on multiple resolutions. A further implementation modifies the accessed disparity value to produce a modified disparity value indicating disparity with respect to the particular resolution.

11 Claims, 8 Drawing Sheets

(56) References Cited

U.S. PATENT DOCUMENTS

| | | | |
|---|---|---|---|
| 6,515,663 | B1 | 2/2003 | Hung et al. |
| 7,092,003 | B1 | 8/2006 | Siegel et al. |
| 7,738,712 | B2 | 6/2010 | Tzeng et al. |
| 8,090,195 | B2* | 1/2012 | Oyama ............... G01C 3/085 382/154 |
| 8,374,463 | B1* | 2/2013 | Anderson et al. .......... 382/298 |
| 2001/0045979 | A1* | 11/2001 | Matsumoto ............ G06K 9/20 348/43 |
| 2002/0145610 | A1 | 10/2002 | Barilovits et al. |
| 2002/0181738 | A1 | 12/2002 | Nakamura et al. |
| 2004/0008876 | A1* | 1/2004 | Lure ..................... G06F 19/00 382/128 |
| 2005/0132191 | A1 | 6/2005 | Joshi et al. |
| 2006/0290778 | A1* | 12/2006 | Kitaura ............... H04N 13/128 348/51 |
| 2007/0047040 | A1 | 3/2007 | Ha |
| 2007/0154114 | A1 | 7/2007 | Tzeng et al. |
| 2007/0229653 | A1 | 10/2007 | Matusik et al. |
| 2008/0043095 | A1 | 2/2008 | Vetro et al. |
| 2008/0043096 | A1 | 2/2008 | Vetro et al. |
| 2008/0112616 | A1 | 5/2008 | Koo et al. |
| 2008/0136819 | A1* | 6/2008 | Shivas ................. G06T 3/4092 345/428 |
| 2008/0240549 | A1* | 10/2008 | Koo ......................... G06T 7/97 382/154 |
| 2008/0297522 | A1* | 12/2008 | Kodaka ................ G06F 9/5066 345/505 |
| 2009/0033650 | A1* | 2/2009 | Takeda ..................... G09G 3/20 345/214 |
| 2009/0096863 | A1 | 4/2009 | Kim et al. |
| 2009/0244066 | A1 | 10/2009 | Sugita et al. |
| 2010/0002948 | A1 | 1/2010 | Gangwal et al. |
| 2010/0091098 | A1* | 4/2010 | Yoshifuji ........... H04N 13/0022 348/54 |
| 2011/0123068 | A1 | 5/2011 | Miksa et al. |
| 2012/0084652 | A1 | 4/2012 | Martinez Bauza et al. |
| 2012/0314771 | A1 | 12/2012 | Lim |
| 2013/0010057 | A1 | 1/2013 | Borel et al. |
| 2013/0077853 | A1 | 3/2013 | Chauvier et al. |
| 2014/0334555 | A1 | 11/2014 | Zhang |

FOREIGN PATENT DOCUMENTS

| | | |
|---|---|---|
| CN | 1774937 | 5/2006 |
| CN | 101184252 | 5/2008 |
| CN | 101547376 | 9/2009 |
| CN | 100574462 | 12/2009 |
| CN | 102934451 A | 2/2013 |
| CN | 102934451 B | 10/2016 |
| EP | 0422793 | 4/1991 |
| EP | 0735512 | 10/1996 |
| EP | 735512 | 10/1996 |
| EP | 1617684 | 1/2006 |
| EP | 1662809 | 5/2006 |
| EP | 1686808 | 8/2006 |
| EP | 1807806 A1 | 7/2007 |
| EP | 1968329 | 9/2008 |
| EP | 1978754 | 10/2008 |
| EP | 1978755 | 10/2008 |
| GB | 2479784 | 10/2011 |
| JP | 8018954 | 1/1996 |
| JP | 11127339 | 5/1999 |
| JP | 2000321050 | 11/2000 |
| JP | 2001306287 | 11/2001 |
| JP | 2002320083 | 10/2002 |
| JP | 2005073049 | 3/2005 |
| JP | 2008167282 | 7/2008 |
| JP | 2008257686 | 10/2008 |
| JP | 2008259171 | 10/2008 |
| JP | 2009518877 | 5/2009 |
| JP | 2009278495 | 11/2009 |
| JP | 2010098700 | 4/2010 |
| JP | 2015505196 | 2/2015 |
| KR | 2004018859 | 3/2004 |
| KR | 100727940 | 6/2007 |
| KR | 100778085 | 11/2007 |
| KR | 2009077515 | 7/2009 |
| TW | 421969 | 2/2001 |
| TW | 452757 | 9/2001 |
| TW | 200737038 | 10/2007 |
| TW | 201101839 | 1/2011 |
| WO | WO05020591 | 3/2005 |
| WO | 2006046180 A1 | 5/2006 |
| WO | WO2007057497 | 5/2007 |
| WO | WO07119666 | 10/2007 |
| WO | WO2009083863 | 7/2009 |
| WO | 2009101798 A1 | 8/2009 |
| WO | WO2010064118 | 6/2010 |
| WO | WO2010064784 | 6/2010 |
| WO | WO2011121437 | 10/2011 |
| WO | WO2012161734 | 11/2012 |

OTHER PUBLICATIONS

Gehrig et al., "Improving Stereo Sub-Pixel Accuracy for Long Range Stereo," 2007 11th IEEE Int'l. Converence on Computer Vision, Oct. 17-21, 2007.

Jones et al., "Controlling Perceived Depth in Stereoscopic Images," Sharp Laboratories of Europe Ltd.

Lambooij et al., "Visual Discomfort and Visual Fatigue of Stereoscopic Displays: A Review," Journal of Imaging Science and Technology, 53(3), May-Jun. 2009, Society for Imaging Science and Technology 2009.

Tong et al., "A Novel Object-Oriented Stereo Matching on Multiscale Sueprpixels for Low-Resolution Depth Mapping", 32nd Annual International Conference on the IEEE EMBS, Buenos Aires, Argentina, Aug. 31-Sep. 4, 2010.

Garcia et al., "Pixel Weighted Average Strategy for Depth Sensor Data Fusion", Proceedings of 2010 IEEE 17th International Conference on Image Processing, Hong Kong, Sep. 27-29, 2010.

Sasaki et al., "Stereo Matching Algorithm Using a Weighted Average of Costs Aggregated by Various Window Sizes", ACCV 2006, LNCS 3852, pp. 771-780, 2006.

Sasaki et al., "Window-based Stereo Matching Aloorithim Using a Weighted Average of Costs Aggregated with Window Size Reduction", Japan.

Lambooij et al., "Visual Discomfort in Stereoscopic Displays: A Review," Human Technology Interactions Group, Dept of Technology, Einhoven, Netherlands, SPIE-TS&T/vol. 6490, 2007, pp. 1-13.

SMPTE, "Report of SMPTE Task Force on 3D to the Home". Society of Motion Picture and Television Engineers, Inc. (2009), 78 pages.

International Search Report and Written Opinion of the International Searching Authority for PCT/1132011/000708 dated Jul. 26, 2011, 10 pages.

International Preliminary Report on Patentability for PCT/IB2011/000708 dated Oct. 2, 2012, 7 pages.

* cited by examiner 710       720         730

11,520 = $2^8 \cdot 3^2 \cdot 5$

960 = $2^6 \cdot 3 \cdot 5$ = 11,520 / 12

1280 = $2^6 \cdot 3^0 \cdot 5$ = 11,520 / 9

1440 = $2^5 \cdot 3^2 \cdot 5$ = 11,520 / 8

1920 = $2^7 \cdot 3 \cdot 5$ = 11,520 / 6

2048 = $2^{11}$ = 11,520 · 8/45

4096 = $2^{12}$ = 11,520 · 16/45

8192 = $2^{13}$ = 11,520 · 32/45

3D DISPARITY MAPS

CROSS-REFERENCE TO RELATED APPLICATIONS

This application claims the benefit, under 35 U.S.C. § 365 of International Application PCT/IB2011/000708, filed Mar. 31, 2011, which was published in accordance with PCT Article 21(2) on Oct. 6, 2011, in English and which claims the benefit of U.S. provisional patent application No. 61/319,566, filed Mar. 31, 2010 and 61/397,418 filed Jun. 11, 2010.

TECHNICAL FIELD

Implementations are described that relate to 3D. Various particular implementations relate to disparity maps for video images.

BACKGROUND

Stereoscopic video provides two video images, including a left video image and a right video image. Depth and/or disparity information may also be provided for these two video images. The depth and/or disparity information may be used for a variety of processing operations on the two video images.

SUMMARY

According to a general aspect, a disparity value for a particular location in a picture is accessed. The disparity value indicates disparity with respect to a particular resolution. The accessed disparity value is modified based on multiple resolutions to produce a modified disparity value.

According to another general aspect, a signal or structure includes a disparity portion including a disparity value for a particular location in a picture. The picture has a particular resolution. The disparity value indicates disparity with respect to another resolution that is different from the particular resolution and that is based on multiple resolutions.

According to another general aspect, a disparity value for a particular location in a picture is accessed. The picture has a particular resolution. The disparity value indicates disparity with respect to another resolution that is different from the particular resolution and that is based on multiple resolutions. The accessed disparity value is modified to produce a modified disparity value indicating disparity with respect to the particular resolution.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

As a preview of some of the features presented in this application, at least one implementation describes the use of disparity values based on a resolution considerably larger than any standard display's largest resolution. In this application, the term "resolution" generally refers to the horizontal resolution, and is measured in, for example, number of pixels of a display or number of blocks of pixels of a display, or number of elements of a digital image. The non-standard resolution is an integer that is easily converted to one or more of several standard display resolutions. In this particular implementation, the effective display resolution is the smallest common multiple of several standard display resolutions. The disparity values for the effective display resolution are represented in integer format. The disparity values are potentially large as a result of being based on a large non-display resolution. Yet, the integer representations provide for sub-pixel accuracy when the disparity values are converted down to a standard display resolution.

Figure 1:
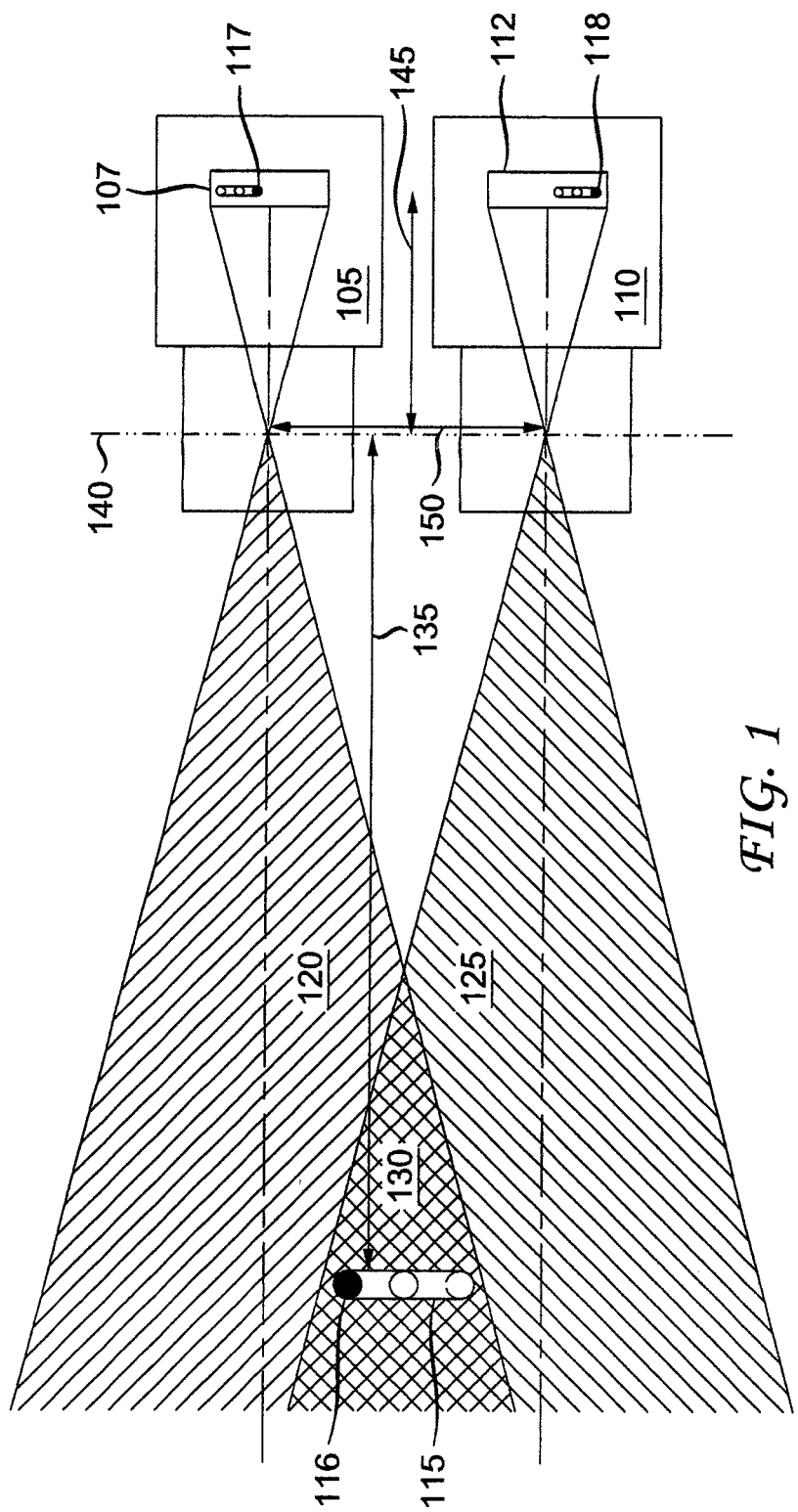
FIG. 1 is a pictorial representation of an actual depth value for parallel cameras.

Stepping back from the above preview, FIG. 1 illustrates the concept of depth in a video image. FIG. 1 shows a right camera 105 with a sensor 107, and a left camera 110 with a sensor 112. Both cameras 105, 110 are capturing images of an object 115. For the purposes of illustration, object 115 is a physical cross, having an arbitrary detail 116 located on the right side of the cross (see FIG. 2). The right camera 105 has a capture angle 120, and the left camera 110 has a capture angle 125. The two capture angles 120, 125 overlap in a 3D stereo area 130.

Because the object 115 is in the 3D stereo area 130, the object 115 is visible to both cameras 105, 110, and therefore the object 115 is capable of being perceived as having a depth. The object 115 has an actual depth 135. The actual depth 135 is generally referred to as the distance from the object 115 to the cameras 105, 110. More specifically, the actual depth 135 may be referred to as the distance from the object 115 to a stereo camera baseline 140, which is the plane defined by the entrance pupil plane of both cameras 105, 110. The entrance pupil plane of a camera is typically inside a zoom lens and, therefore, is not typically physically accessible.

The cameras 105, 110 are also shown having a focal length 145. The focal length 145 is the distance from the exit pupil plane to the sensors 107, 112. For the purposes of illustration, the entrance pupil plane and the exit pupil plane are shown as coincident, when in most instances they are slightly separated. Additionally, the cameras 105, 110 are shown as having a baseline length 150. The baseline length 150 is the distance between the centers of the entrance pupils of the cameras 105, 110, and therefore is measured at the stereo camera baseline 140.

The object 115 is imaged by each of the cameras 105 and 110 as real images on each of the sensors 107 and 112. These real images include a real image 117 of the detail 116 on the sensor 107, and a real image 118 of the detail 116 on the sensor 112. As shown in FIG. 1, the real images are flipped, as is known in the art.

Figure 2:
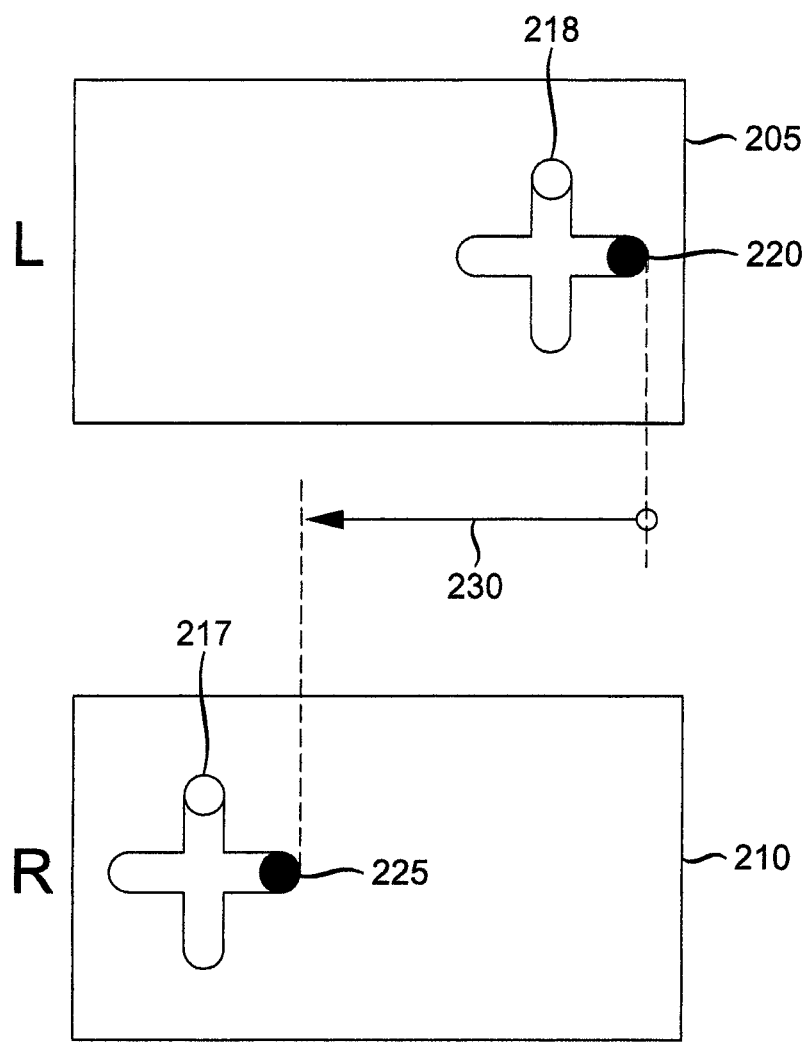
FIG. 2 is a pictorial representation of a disparity value.

Depth is closely related to disparity. FIG. 2 shows a left image 205 captured from the camera 110, and a right image 210 captured from the camera 105. Both images 205, 210 include representation of the object 115 with detail 116. The image 210 includes a detail image 217 of the detail 116, and the image 205 includes a detail image 218 of the detail 116. The far right point of the detail 116 is captured in a pixel 220 in the detail image 218 in the left image 205. and is captured in a pixel 225 in the detail image 217 in the right image 210. The horizontal difference between the locations of the pixel 220 and the pixel 225 is the disparity 230. The object images 217, 218 are assumed to be registered vertically so that the images of detail 116 have the same vertical positioning in both the images 205, 210. The disparity 230 provides a perception of depth to the object 215 when the left and right images 205, 210 are viewed by the left and right eyes, respectively, of a viewer.

Figure 3:
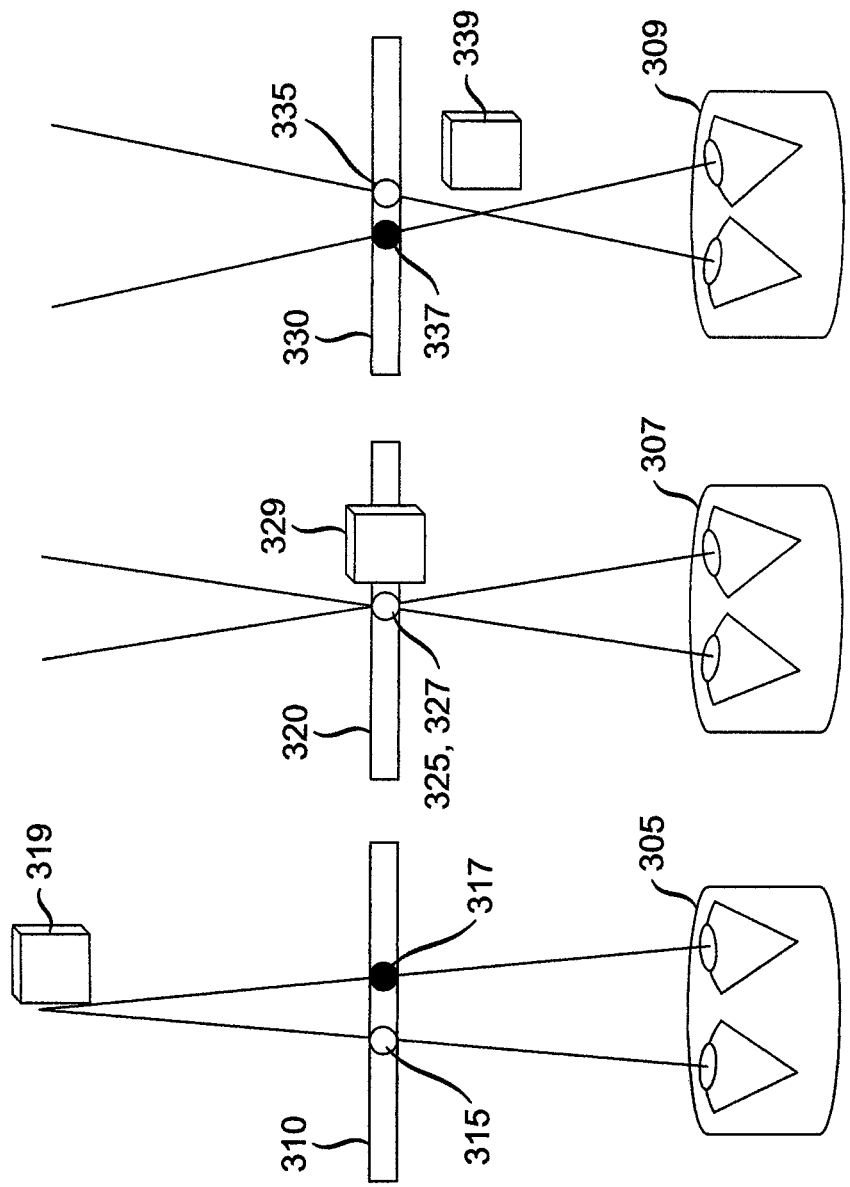
FIG. 3 is a pictorial representation of the relationship between apparent depth and disparity.

FIG. 3 shows the relationship between disparity and perceived depth. Three observers 305, 307, 309 are shown viewing a stereoscopic image pair for an object on a respective screens 310, 320, 330.

The first observer 305 views a left view 315 of the object and a right view 317 of the object that have a positive disparity. The positive disparity reflects the fact that the left view 315 of the object is to the left of the right view 317 of the object on the screen 310. The positive disparity results in a perceived, or virtual, object 319 appearing to be behind the plane of the screen 310.

The second observer 307 views a left view 325 of the object and a right view 327 of the object that have zero disparity. The zero disparity reflects the fact that the left view 325 of the object is at the same horizontal position as the right view 327 of the object on the screen 320. The zero disparity results in a perceived, or virtual, object 329 appearing to be at the same depth as the screen 320.

The third observer 309 views a left view 335 of the object and a right view 337 of the object that have a negative disparity. The negative disparity reflects the fact that the left view 335 of the object is to the right of the right view 337 of the object on the screen 330. The negative disparity results in a perceived, or virtual, object 339 appearing to be in front of the plane of the screen 330.

It is worth noting at this point, that disparity and depth can be used interchangeably in implementations unless otherwise indicated or required by context. Using Equation 1, we know disparity is inversely-proportional to scene depth.

$$D = \frac{f \cdot b}{d} \quad (1)$$

where "D" describes depth (135 in FIG. 1), "b" is the baseline length (150 in FIG. 1) between two stereo-image cameras, "f" is the focal length for each camera (145 in FIG. 1), and "d" is the disparity for two corresponding feature points (230 in FIG. 2).

Equation 1 above is valid for parallel cameras with the same focal length. More complicated formulas can be defined for other scenarios but in most cases Equation 1 can be used as an approximation. Additionally, however, Equation 2 below is valid for at least various arrangements of converging cameras, as is known by those of ordinary skill in the art:

$$D = \frac{f \cdot b}{d_\infty - d} \quad (2)$$

$d_\infty$ is the value of disparity for an object at infinity. $d_\infty$ depends on the convergence angle and the focal length, and is expressed in meters (for example) rather than in the number of pixels. Focal length was discussed earlier with respect to FIG. 1 and the focal length 145. Convergence angle is shown in FIG. 4.

Figure 4:
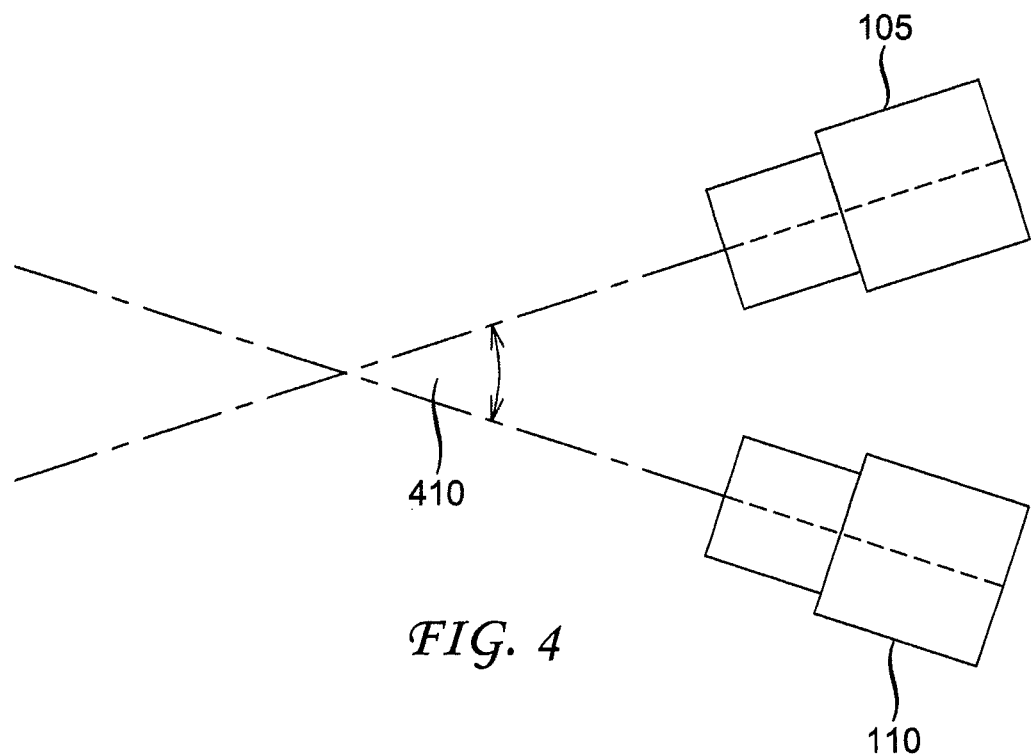
FIG. 4 is a pictorial representation of convergent cameras.

FIG. 4 includes the camera 105 and the camera 110 positioned in a converging configuration rather than the parallel configuration of FIG. 1. An angle 410 shows the lines of sight of the cameras 105, 110 converging, and the angle 410 may be referred to as the convergence angle.

Disparity maps are used to provide disparity information for a video image. A disparity map generally refers to a set of disparity values with a geometry corresponding to the pixels in the associated video image.

A dense disparity map generally refers to a disparity map with a spatial and a temporal resolution that are typically identical to the resolution of the associated video image. The temporal resolution refers, for example, to frame rate, and may be, for example, either 50 Hz or 60 Hz. A dense disparity map will, therefore, generally have one disparity sample per pixel location. The geometry of a dense disparity map will typically be the same as that of the corresponding video image, for example, a rectangle having a horizontal and vertical size, in pixels of:
  (i) 1920×1080 (or 1920×1200),
  (ii) 1440×1080 (or 1440×900),
  (iii) 1280×720 (or 1280×1024, 1280×960, 1280×900, 1280×800),
  (iv) 960×640 (or 960×600, 960×576, 960×540),
  (v) 2048×1536 (or 2048×1152),
  (vi) 4096×3072 (or 4096×3112, 4096×2304, 4096×2400, 4096×2160, 4096×768), or
  (vii) 8192×4302 (or 8192×8192, 8192×4096, 7680× 4320).

It is possible that the resolution of a dense disparity map is substantially the same as, but different from, the resolution of the associated image. In one implementation, the disparity information at the image boundaries are difficult to obtain. Therefore, in that implementation, the disparity values at the boundary pixels are not included in the disparity map, and the disparity map is smaller than the associated image.

A down-sampled disparity map generally refers to a disparity map with a resolution smaller than the native video resolution (for example, divided by a factor of four). A down-sampled disparity map will, for example, have one disparity value per block of pixels.

A sparse disparity map generally refers to a set of disparities corresponding with a limited number of pixels (for example 1000) that are considered to be easily traceable in the corresponding video image. The limited number of pixels that are selected will generally depend on the content itself. There are frequently upwards of one or two million pixels in an image (1280×720, or 1920×1080). The pixel subset choice is generally automatically or semi-automatically done by a tracker tool able to detect feature points. Tracker tools are readily available. Feature points may be, for example, edge or corner points in a picture that can easily be tracked in other images. Features that represent high contrast edges of an object are generally preferred for the pixel subset.

Disparity maps, or more generally, disparity information, may be used for a variety of processing operations. Such operations include, for example, view interpolation (rendering) for adjusting the 3D effect on a consumer device, providing intelligent subtitle placement, visual effects, and graphics insertion.

In one particular implementation, graphics are inserted into a background of an image. In this implementation, a 3D presentation includes a stereoscopic video interview between a sportscaster and a football player, both of whom are in the foreground. The background includes a view of a stadium. In this example, a disparity map is used to select pixels from the stereoscopic video interview when the corresponding disparity values are less than (that is, nearer than) a predetermined value. In contrast, pixels are selected from a graphic if the disparity values are greater than (that is, farther than) the predetermined value. This allows, for example, a director to show the interview participants in front of a graphic image, rather than in front of the actual stadium background. In other variations, the background is substituted with another environment, such as, for example, the playfield during a replay of the player's most recent scoring play.

In one implementation, the 3D effect is softened (reduced) based on a user preference. To reduce the 3D effect (reduce the absolute value of the disparity), a new view is interpolated using the disparity and video images. For example, the new view is positioned at a location between the existing left view and right view, and the new view replaces one of the left view and the right view. Thus, the new stereoscopic image pair has a smaller baseline length and will have a reduced disparity, and therefore a reduced 3D effect.

In another implementation, extrapolation, rather than interpolation, is performed to exaggerate the apparent depth and thereby increase the 3D effect. In this implementation, a new view is extrapolated corresponding to a virtual camera having an increased baseline length relative to one of the original left and right views.

In another example, disparity maps are used to intelligently position subtitles in a video image so as to reduce or avoid viewer discomfort. For example, a subtitle should generally have a perceived depth that is in front of any object that the subtitle is occluding. However, the perceived depth should generally have a depth that is comparable to the region of interest, and not too far in front of the objects that are in the region of interest.

For many 3D processing operations, a dense disparity map is preferred over a down-sampled disparity map or a sparse disparity map. For example, when a disparity map is used to enable user-controllable 3D-effects, disparity information on a per-pixel basis is generally preferred. The per-pixel basis disparity information generally allows better results to be achieved, because using a sparse or down-sampled disparity map may degrade the quality of synthesized views.

A disparity value may be represented in a variety of formats. Several implementations use the following format to represent a disparity value for storage or transmission:
  (i) Signed integer: 2s complement
     (a) Negative disparity values indicate depth that is in front of the screen.
     (b) Zero is used for disparity value for objects in the screen plane.
  (ii) Units of ⅛ pixel
  (iii) 16 bits to represent the disparity value
     (a) A typical disparity range varies between +80 and −150 pixels. This is generally sufficient on a forty inch display having a resolution of 1920 or 2048.
     (b) With ⅛ pixel accuracy, the range is between +640 and −1200 units, which can be represented by 11 bits+1 bit for the sign=12 bits
     (c) To keep the same 3D effect on an 8 k display (which would have approximately four times the horizontal resolution of a display that is 1920 or 2048 pixels wide), we typically need two additional bits to code the disparity: 12+2=14 bits
     (d) This provides 2 bits for future use Further, various implementations that use the above format also provide for a dense disparity map. Thus, to complete a dense disparity map for such implementations, the above 16-bit format is provided for every pixel location in a corresponding video image.

Figure 5:
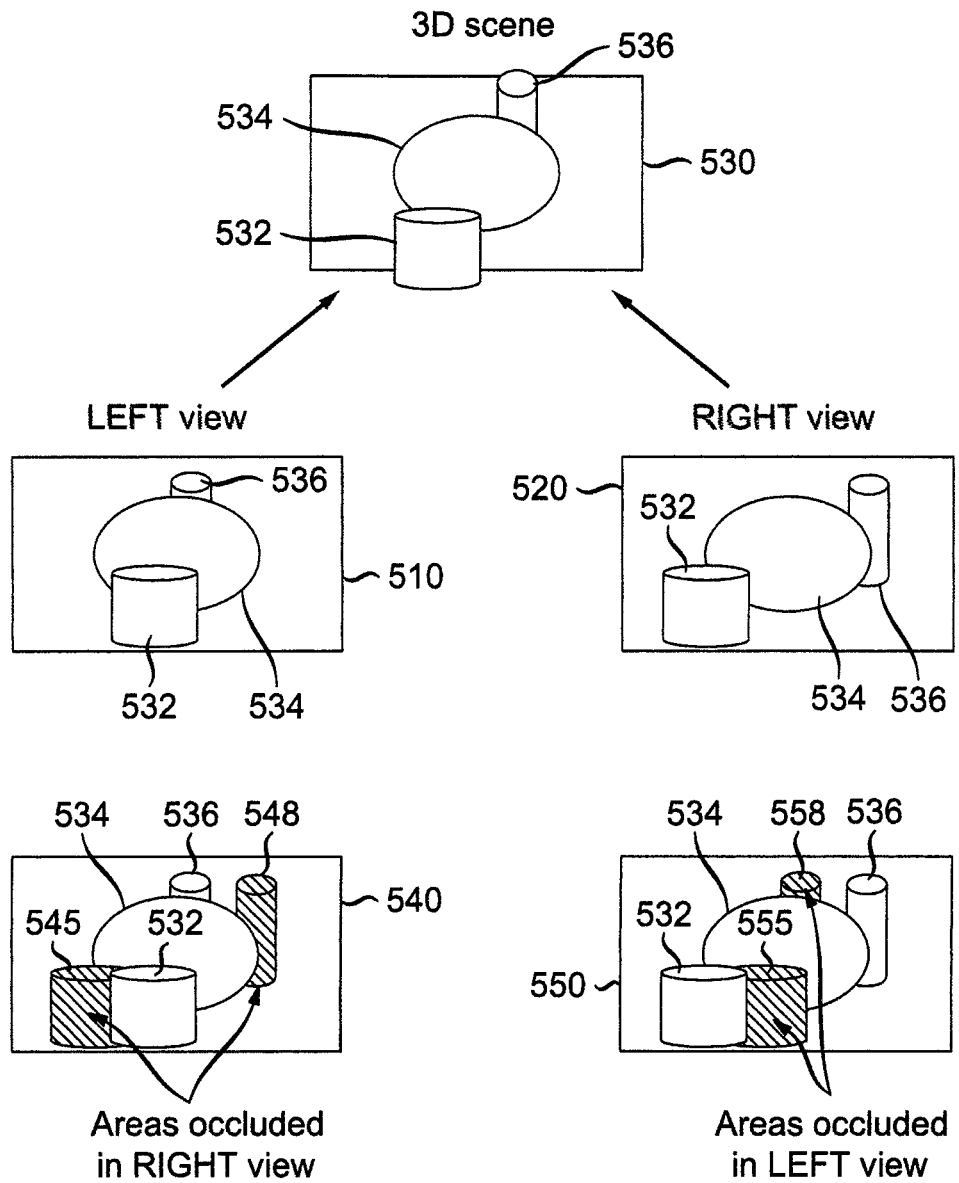
FIG. 5 is a pictorial representation of occlusion in stereoscopic video image pairs.

Disparity, and the related depth variations, produce occlusions between different views of a scene. FIG. 5 shows a left view 510 and a right view 520 that combine, in a viewer's brain, to produce a 3D scene 530. The left view 510, the right view 520, and the 3D scene 530 each contain three objects, which include a wide cylinder 532, an oval 534, and a thin cylinder 536. However, as shown in FIG. 5, two of the three objects 532, 534, 536 are in different relative locations in each of the views 510, 520 and the 3D scene 530. Those two objects are the wide cylinder 532 and the thin cylinder 536. The oval 534 is in the same relative location in each of the views 510, 520 and the 3D scene 530.

The different relative locations produce occlusions, as explained by the following simplified discussion. The left view 510 is shown in a left image 540 that also reveals occluded areas 545 and 548. The occluded areas 545 and 548 are only visible in the left view 510 and not in the right view 520. This is because (i) the area in the right view 520 that corresponds to the occluded area 545 is covered by the wide cylinder 532, and (ii) the area in right view 520 that corresponds to the occluded area 548 is covered by the narrow cylinder 536.

Similarly, the right view 520 is shown in a right image 550 that also reveals two occluded areas 555 and 558. The occluded areas 555, 558 are only visible in the right view 520 and not in the left view 510. This is because (i) the area in the left view 510 that corresponds to the occluded area 555 is covered by the wide cylinder 532, and (ii) the area in the left view 510 that corresponds to the occluded area 558 is covered by narrow cylinder 536.

Given that occlusions may exist in a stereoscopic image pair, it is useful to provide two disparity maps for a stereoscopic image pair. In one such implementation, a left disparity map is provided for a left video image, and a right disparity map is provided for a right video image. Known algorithms may be used to assign disparity values to pixel locations of each image for which disparity values cannot be determined using the standard disparity vector approach. Occlusion areas can then determined by comparing the left and right disparity values.

As an example of comparing left and right disparity values, consider a left-eye image and a corresponding right-eye image. A pixel L is located in row N and has a horizontal coordinate $x_L$ in the left-eye image. Pixel L is determined to have a disparity value $d_L$. A pixel R is located in row N of the corresponding right-eye image and has a horizontal coordinate nearest $x_L + d_L$. The pixel R is determined to have a disparity value $d_R$ of about "$-d_L$". Then, with a high degree of confidence, there is no occlusion at L or R because the disparities correspond to each other. That is, the pixels L and R both point to each other, generally, with their determined disparities.

However, if $d_R$ is not substantially the same as $-d_L$, then there may be an occlusion. For example, if the two disparity values are substantially different, after accounting for the sign, then there is generally a high degree of confidence that there is an occlusion. Substantial difference is indicated, in one implementation, by $|d_L - d_R| > 1$. Additionally, if one of the disparity values (either $d_R$ or $d_L$) is unavailable, then there is generally a high degree of confidence that there is an occlusion. A disparity value may be unavailable because, for example, the disparity value cannot be determined. The occlusion generally relates to one of the two images. For example, the portion of the scene shown by the pixel associated with the disparity having the smaller magnitude, or shown by the pixel corresponding to the unavailable disparity value, is generally considered to be occluded in the other image.

One possibility for representing disparity values is to use an integer to represent the number of pixels of disparity for a given pixel location in a video image. The disparity value represents the number of pixels of disparity for the particular horizontal resolution of the video image. The disparity value depends, therefore, on the particular horizontal resolution. Such implementations are useful and can be effective.

Other implementations, however, require sub-pixel accuracy in disparity values. Such implementations generally use floating point numbers to represent disparity values so that fractions can be included in the disparity values. Several of these implementations provide disparity values that are specific to a given horizontal resolution. These implementations are also useful and can be effective.

Some other implementations represent disparity values as a percentage value. Therefore, instead of representing the disparity as a number of pixels, the disparity is represented as a percentage of the horizontal resolution. For example, if the disparity for a given pixel location is ten pixels, and the horizontal resolution is 1920, then the percentage disparity value is $(10/1920)*100$. Such implementations can also provide sub-pixel accuracy in disparity. A percentage value representation is typically a floating point representation, rather than an integer representation. For example, one pixel of disparity in a display having a horizontal resolution of 1920 is 1/1920, which is 0.0005208 or 0.05208%.

Further, such percentage disparity values can be applied directly to other horizontal resolutions. For example, assume that (i) a video image has a horizontal resolution of 1920, (ii) the video image is transmitted to a user's home, and (iii) the user's display device has a horizontal resolution of 1440. In this scenario, the user's display device (or set-top box, or some other processor or processing device) typically converts the video image's horizontal resolution from 1920 to 1440, and also converts the disparity values so that the disparity values correspond to a horizontal resolution of 1440. The conversion may be performed, for example, by multiplying the percentage disparity value by the horizontal resolution. For example, if the percentage disparity for a given pixel location is ½%, and the horizontal resolution is 1920, then the absolute disparity value is ½*1920/100. Several of these implementations use a single disparity value, which is a percentage disparity value, in the transmission and storage of disparity values, regardless of the horizontal resolution of the video image and the disparity map. Such implementations are also useful, and can be effective.

As mentioned above, a transmission system may use a horizontal resolution in the transmission format that is different from the horizontal resolution of the video image. Additionally, a receiving system may use a different horizontal resolution to display the video image. Thus, a conversion from one horizontal resolution to another horizontal resolution may be required. Such a conversion not only changes the resolution of the video image, but also requires that the disparity values be adjusted. Such a conversion would generally be required for absolute disparity values, but not for percentage disparity values.

The following example provides more details about some of the trade-offs between various implementations:

(i) One implementation formats the disparity value as an absolute value (number of pixels) for a given video resolution with a precision of $⅛^{th}$ of a pixel (for example, an object could have 10 pixels of disparity on a video content having 1920 horizontal pixels).

(ii) There are many advantages of such a system, including simplicity and ease of manipulation.

(iii) In one such system, 11 bits are used: 8 bits for the integer part to provide up to 255 pixels of disparity, and 3 bits for the decimal part (to get the $⅛^{th}$ precision or accuracy). Note that a sign bit would be used as well, or the system could provide disparity values of +/−127 pixels.

(iv) If the video image needs to be reformatted during transmission, the disparity map is reformatted as well, possibly leading to information loss. For example, referring to FIG. 6, an implementation uses a native format 610 that has a horizontal resolution of 1920 and a transmission format 620 that is down sampled to have a horizontal resolution of 1280 (or 1440 in another implementation). The depth or disparity map, as with the video image, is filtered before sub-sampling which typically leads to a loss of depth details. The filtering occurs in a filtering and sub-sampling operation 630. The filtering and sub-sampling operation is applied to the video images and the disparity images.

(v) Furthermore, the new disparity value is converted, and typically corrupted. For example, after down sampling to reduce the resolution of the disparity map (that is, to reduce the number of disparity values), the disparity values are converted to the resolution of the transmission format. The disparity value of 10 pixels becomes 6.6666 when passing from 1920 to 1280. This results, for example, in rounding off the value to 6.625 since the decimal part can only be a multiple of 0.125 (⅛).

(vi) After transmission, if the display is 1920 pixels wide, the final disparity value will be 6.625×1920/1280=9.9375. The value of 9.9375 represents some distortion as compared to the original value of 10. The value of 9.9375 may be rounded up, down, or to the nearest integer, or the nearest ⅛th, for example, possibly creating information loss. The loss would be significant if the value were rounded down.

One solution is to use a percentage disparity that may be common to all horizontal resolutions. Such an implementation, described above, has advantages and drawbacks. The use of percentage disparity values allows the conversion operation prior to transmission to be omitted.

Another solution is to use an integer value that is not specific to any one common resolution. (Note that pictures are typically assumed to have been rectified vertically as well as receiving other processing. Accordingly, it is typically sufficient to discuss disparity in terms of horizontal displacement.) This solution proposes to define a reference resolution (or virtual resolution) of 11,520 pixels, which is referred to in this application as the smallest common multiple ("SCM") of several standard TV horizontal resolutions (720, 960, 1280, 1440, 1920). Note that the SCM is also referred to in various references as the "lowest common multiple" or "least common multiple".

At least one implementation of this SCM solution has a number of advantages, including the following (other implementations need not have all of these advantages):

(i) Because the disparity value is an integer, determining and storing the disparity value is simple, and the disparity value is easy to manipulate and process.

(ii) The disparity value is no longer strictly absolute but has a relative aspect, and therefore is independent of the native video resolution.

(iii) A decimal part is not required.

(iv) The disparity value is like a percentage because it is relative, and independent of the native video resolution. However, the disparity value is an integer, so there is no apparent need to code complicated numbers like 0.00868% to describe the minimum disparity value. The minimum disparity value is one pixel, and $\frac{1}{11,520}$ is 0.00868%.

(v) There is no apparent need to transcode the disparity value during transport because the disparity value refers to 11,520.

(vi) When the SCM-based disparity values arrive at, for example, the set-top box ("STB"), the STB calculates the real absolute disparity for a given video resolution by performing a very simple operation, such as, for example:
   (a) Disparity/6 for 1920 resolution
   (b) Disparity/8 for 1440 resolution
   (c) Disparity/9 for 1280 resolution
   (d) Disparity/12 for 960 resolution (vii) The disparity information is not degraded during the transport, as long as there is no transcoding, regardless of which channels are used.

(viii) Even for newer consumer resolutions like 2 k, 4 k, 8 k, the operation is simple to implement, and it is easily implementable in a STB processing unit. Note that 2 k generally refers to images having a horizontal pixel resolution of 2048, 4 k generally refers to 4096, and 8 k generally refers to 8192. The operations are, for example:
   (a) Disparity×8/45 for 2048 resolution
   (b) Disparity×16/45 for 4096 resolution
   (c) Disparity×32/45 for 8192 resolution In practice, one or more SCM implementations (1) determine the disparity values for the existing horizontal resolution of the corresponding video content, (2) convert those disparity values to the scale of 11,520 with a simple multiplication and/or division to create an SCM disparity value, (3) store and transmit the SCM disparity values without transcoding, and (4) convert the received SCM disparity values to the resolution of the output display using a simple multiplication and/or division. Because there is no transcoding, this solution would generally not suffer from loss of information (for example, rounding losses) due to transcoding. Note that the resolution of the disparity map is not changed by the above process. Rather, the existing disparity values (for the existing resolution) are scaled so that they are based on, or reflect, a reference resolution (or virtual resolution) that is different from the actual resolution.

Figures 6, 7:
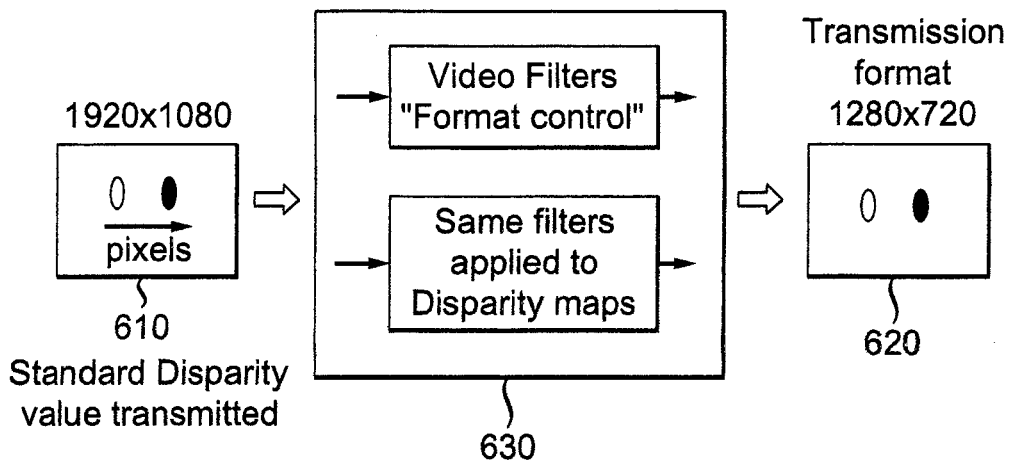
FIG. 6 is a block/flow diagram depicting an implementation having a different native format and transmission format.
FIG. 7 is a tabular representation of an example of a common multiple representation of disparity values.

Various implementations create disparity values by performing a simple mathematical operation that is the inverse of those described above. For example, to create an SCM disparity value, the received absolute disparity value is multiplied and/or divided by one or two integers as follows:
   (i) 1920 disparity*6=SCM disparity
   (ii) 1440 disparity*8=SCM disparity
   (iii) 1280 disparity*9=SCM disparity
   (iv) 960 disparity*12=SCM disparity
   (v) 2048 disparity*45/8=SCM disparity
   (vi) 4096 disparity*45/16=SCM disparity
   (vii) 8192 disparity*45/32=SCM disparity FIG. 7 provides more detail into the process of determining a smallest common multiple for various different horizontal resolutions. A column 710 lists the different horizontal resolutions. A column 720 lists the smallest factors of the horizontal resolutions. For example, 960 is factored into $2^6*3*5$, where $2^6$ is 2 raised to the $6^{th}$ power. Thus, 960=64*3*5. It is also noted, with respect to the horizontal resolution of 1280, that 3° is equal to one.

The smallest common multiple of the first four resolutions of 960, 1280, 1440, and 1920, is 28*32 * 5, which is 11,520. The 11,520 resolution is used with resolutions of 2 k, 4 k, and 8 k, by multiplying by an appropriate power of 2, and then dividing by the factors 32 and 5 which are not present in 2 k, 4 k, and 8 k. Note that multiplying by a power of 2 is performed, in various implementations, using a bitwise left-shift operation, rather than an actual multiplication operation. FIG. 7 includes a column 730 that provides the conversion equation to convert between 11,520 and the various resolutions shown in the column 710.

The conversion equations of the column 730 can be used to scale disparity values based on resolutions supported by multiple common display sizes (the display size referring to the physical size of the display, measured, for example, in inches or centimeters). In the example of FIG. 6, input disparity values that are based on, for example, a horizontal resolution of 1920 are scaled by a factor of six to convert the disparity value into a new disparity value that is based on a horizontal resolution of 11,520. The new disparity value is also based on the horizontal resolutions of 960, 1280, and 1440 because those resolutions are accommodated by, and are used in determining, the resolution of 11,520.

An alternate implementation simply uses a disparity resolution of $11,520*2^5=368,640$. In this alternate implementation, no multiplication is needed to convert the 368,640 back to the original resolution.

The value of 11,520 is used for various implementations. However, other values are used in other implementations. In one implementation, the 11,520 value is doubled to 23,040. In a second implementation, the 368,640 value is doubled to 737,280.

Alternatively, a different set of horizontal resolutions is used in various implementations, resulting in a different SCM. For example, in another implementation only 1920 and 1440 output resolutions are of interest, and therefore the implementation uses an SCM of 5,760. Then, to generate the SCM disparity values, disparity values from the 1920 resolution are multiplied by a factor of 3, and disparity values from the 1440 resolution are multiplied by a factor of 4.

It should be clear that various implementations are not SCM implementations. For example, even the 11,520 value is not the SCM of all seven resolutions listed in the column 710. Rather, the 368,640 value is the SCM. Nonetheless, the implementations described in this application are generally referred to as SCM implementations even if the disparity value is not the smallest common multiple of all of the horizontal resolutions.

Note that the SCM implementations provide sub-pixel accuracy. For example, for a 1920 resolution, the disparity values use a factor of 6 to convert to/from the 11,520 resolution, which provides $\frac{1}{6}^{th}$ pixel accuracy. More specifically, if the 11,520-based disparity value is 83, then the 1920-based disparity value is 13⅚. This obviously provides $\frac{1}{6}^{th}$ pixel accuracy. This provides various advantages in terms of quality, as well as margin for future needs. For example, if the 1920 resolution is replaced by the 2 k resolution, the 11,520-based disparity values still provide a sub-pixel accuracy of $\frac{8}{45}^{th}$ pixel accuracy, which is slightly less accurate than $\frac{1}{6}^{th}$ (7.5/45) pixel, but still more accurate than $\frac{1}{5}^{th}$ (9/45) pixel.

At least one implementation that uses the SCM resolution of 11,520 operates with a two byte (sixteen bit) format. A typical disparity range often varies between +80 and −150 pixels on a 1920×1080 display (resolution). Multiplying those numbers by six, produces a range of +480 to −900 on the 11,520 reference resolution. This range of 1380 can be represented by eleven bits ($2^{11}$=2048). An alternate implementation uses ten bits to represent the absolute value of the disparity (disparity maximum absolute value is 900), and an additional bit to represent the sign.

Yet another implementation conserves a bit by considering the sign of the disparity to be implicit. For example, the disparity of pixels in a left view is coded, along with the sign of the disparity. However, the disparity of corresponding pixels in a corresponding right view are assumed to have the opposite sign.

Another implementation, in order to be able to provide one dense disparity map per view (both left view and right view), and thereby to reduce issues caused by occlusions, allocates a bit to indicate the view to which the dense disparity map corresponds. Another implementation provides an implicit association between an image (either a left image or a right image) and a corresponding dense disparity map, and therefore does not need to devote a bit to this information. Variations on these implementations use one or more additional bits to introduce other types of maps or images. One such implementation uses two bits to indicate whether the map is (i) a left image disparity map, (ii) a right image disparity map, (iii) an occlusion map, or (iv) a transparency map. One implementation has a sixteen bit format, and uses 11 bits to indicate a range of −900 to +480, two bits to indicate the type of map, and has three bits unused.

Figure 8:
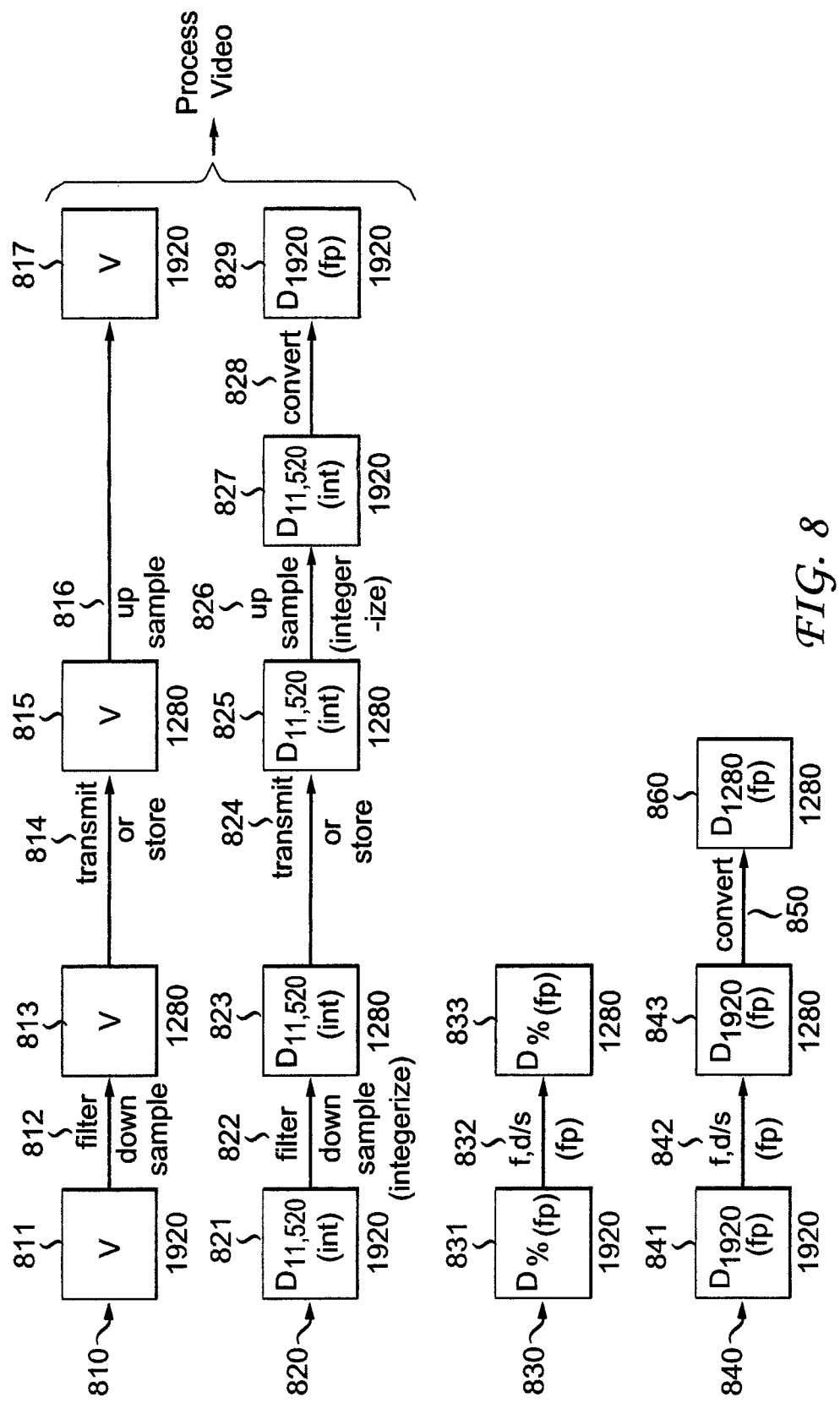
FIG. 8 is a block/flow diagram depicting an example of a process for transmission and use of a common multiple representation of disparity values.

FIG. 8 provides a block/flow diagram that illustrates the operation of one or more implementations. FIG. 8 also illustrates some of the trade-offs between different implementations.

FIG. 8 includes a processing chain 810 that processes video. A video image 811 has a horizontal resolution of 1920. However, the transmission format of the processing chain 810 has a horizontal resolution of 1280. Accordingly, the video image 811 is filtered and down-sampled in an operation 812 to produce a video image 813 having a horizontal resolution of 1280. The filtering and down-sampling are performed together in the processing chain 810. Other implementations perform the filtering and down-sampling separately, however. The filtering is used, for example, to low-pass filter the video image 811 with the goal of preventing aliasing when the video image 811 is down-sampled. The video image 813 is conveyed in a transmission and/or storage operation 814.

A receiving side of the chain 810 accesses a received video image 815, which can be the same as, similar to, or different from, the video image 813. For example, in one implementation, the video image 815 is a stored version of the video image 813.

Additionally, in another implementation, the video image 815 represents a reconstructed version of the video image 813 after source encoding and decoding operations (not shown). Further, in yet another implementation, the video image 815 represents an error-corrected version of the video image 813 after channel encoding and decoding (including error correction) operations (not shown). The video image 815 is processed in an upsampling operation 816 to produce a video image 817 having the 1920 horizontal resolution, as in the original video image 811.

FIG. 8 also includes a processing chain 820 that processes disparity images corresponding to the video images processed in the chain 810. A disparity image 821 has a horizontal resolution of 1920, and includes integer-valued disparity values based on a resolution of 11,520. Note that a disparity image refers generally to any accumulation of disparity information, such as, for example, a dense disparity map, a down-sampled disparity map, or a sparse disparity map. Further, the disparity map may correspond, for example, to a picture, a frame, a field, a slice, a macroblock, a partition, or some other collection of disparity information.

However, the transmission format of the processing chain 820 has a horizontal resolution of 1280. Accordingly, the disparity image 821 is filtered and down-sampled in an operation 822 to produce a disparity image 823 having a horizontal resolution of 1280. The filtering and down-sampling are performed together in the processing chain 820. Other implementations perform the filtering and down-sampling separately, however. The filtering is used, for example, to low-pass filter the disparity values of the disparity image 821 with the goal of preventing aliasing when the disparity image 821 is down-sampled.

The disparity values of the disparity image 823 are integer values. This may be accomplished in various ways. In one implementation, the result of the filtering and down-sampling operations is rounded to the nearest integer. In another implementation, any fractional portion is simply discarded. Yet another implementation uses a floating point representation for the disparity values of the disparity image 823. Note that the disparity values are still based on a resolution of 11,520 even after the filtering and down-sampling produces a resolution for the disparity image 823 of 1280.

The disparity image 823 is conveyed in a transmission and/or storage operation 824. A receiving side of the chain 820 accesses a received disparity image 825. The disparity image 825 can be the same as, similar to, or different from, the disparity image 823. For example, in one implementation, the disparity image 825 is a stored version of the disparity image 823. Additionally, in another implementation, the disparity image 825 represents a reconstructed version of the disparity image 823 after source encoding and decoding operations (not shown). Further, in yet another implementation, the disparity image 825 represents an error-corrected version of the disparity image 823 after channel encoding and decoding (including error correction) operations (not shown). The disparity values in the disparity image 825 remain as integers, however, by, for example, using rounding if needed.

The disparity image 825 is processed in an upsampling operation 826 to produce a disparity image 827 having the 1920 horizontal resolution, as in the original disparity image 821. The operation 826 produces integer values for the disparity image 827, using, for example, rounding or truncation.

The disparity values of the disparity image 827 are converted, in a conversion operation 828, from being based on a resolution of 11,520 to being based on a resolution of 1920. The conversion operation 828 divides each disparity value by six, as explained above. The conversion operation 828 produces a disparity image 829. The disparity values of the disparity image 829 are represented as floating point numbers in order to preserve sub-pixel accuracy.

It should be clear that the processing chain 820 includes at least significant advantages. First, the disparity values are integers throughout the chain 820 until the final disparity image 829 is provided. Second, the actual disparity values are not transcoded, despite the fact that the transmission format's horizontal resolution is different from the horizontal resolution of the native disparity map 821. Thus, the disparity values are applicable to a variety of different horizontal resolutions.

A receiving system then processes the video image 817, using the disparity image 829. The processing may include, as explained earlier, adjusting 3D effects, positioning subtitles, inserting graphics, or performing visual effects.

FIG. 8 also depicts a processing chain 830 for comparison purposes. The processing chain 830 also processes disparity images corresponding to the video images processed in the chain 810. The processing chain 830 is an alternative to the processing chain 820. It should be clear that the entire chain 830 is not shown in order to simplify FIG. 8, as will be explained below.

A disparity image 831 has a horizontal resolution of 1920, and includes percentage-based disparity values having a floating point representation. However, the transmission format of the processing chain 830 has a horizontal resolution of 1280. Accordingly, the disparity image 831 is filtered and down-sampled in an operation 832 to produce a disparity image 833 having a horizontal resolution of 1280. The operation 832 may be analogous, for example, to the filtering and down-sampling operation 812 or 822. The percentage-based disparity values of the disparity image 833 continue to be represented in a floating point format.

The rest of the processing chain 830 (not shown) mirrors that of the processing chain 820. The disparity image 833 is conveyed in a transmission and/or storage operation. A receiving side of the chain 830 accesses a received disparity image. The received disparity image is upsampled to a horizontal resolution of 1920, and then the disparity values are converted from being percentage-based to being based on a resolution of 1920. The conversion operation is a multiplication of the percentage times 1920, as explained above. In contrast to the processing chain 820, however, the disparity values of the disparity images in the processing chain 830 are always represented in floating point format.

FIG. 8 also depicts a processing chain 840 for comparison purposes. The processing chain 840 also processes disparity images corresponding to the video images processed in the chain 810. The processing chain 840 is an alternative to the processing chain 820. It should be clear that the entire chain 840 is not shown in order to simplify FIG. 8, as will be explained below.

A disparity image 841 has a horizontal resolution of 1920, and includes disparity values based on the 1920 resolution and having a floating point representation. However, the transmission format of the processing chain 840 has a horizontal resolution of 1280. Accordingly, the disparity image 841 is filtered and down-sampled in an operation 842 to produce a disparity image 843 having a horizontal resolution of 1280. The operation 842 may be analogous, for example, to the filtering and down-sampling operation 812, 822, or 823. The disparity values of the disparity image 843 continue to be represented in a floating point format.

The disparity values of the disparity image 843 are then converted, in a conversion operation 850, to produce a disparity image 860. The conversion operation 850 converts the disparity values from being based on a horizontal resolution of 1920 to being based on a horizontal resolution of 1280. The disparity values of the disparity image 860 continue to be represented in a floating point format.

The rest of the processing chain 840 (not shown) mirrors that of the processing chain 820. The disparity image 860 is conveyed in a transmission and/or storage operation. A receiving side of the chain 840 accesses a received disparity image. The received disparity image is upsampled to a horizontal resolution of 1920, and then the disparity values are converted from being based on a resolution of 1280 to being based on a resolution of 1920. The conversion operation involves multiplying the disparity values by 1920/1280. As with the processing chain 830, and in contrast to the processing chain 820, the disparity values of the disparity images in the processing chain 840 are always represented in floating point format.

In another implementation of the processing chain 840, the conversion operation 850 is not performed. Thus, the disparity values of the disparity image 843 remain as disparity values that are based on a horizontal resolution of 1920. However, the horizontal resolution of the disparity image 843 remains as 1280. Thus, this implementation avoids the conversion prior to transmission, and possibly avoids a re-conversion after reception or retrieval. Avoiding conversion and re-conversion also avoids rounding errors in at least some implementations. This implementation, as with all other implementations in this application, has advantages and can be useful. However, the disparity values are represented with floating point numbers throughout the implementation.

Figure 9:
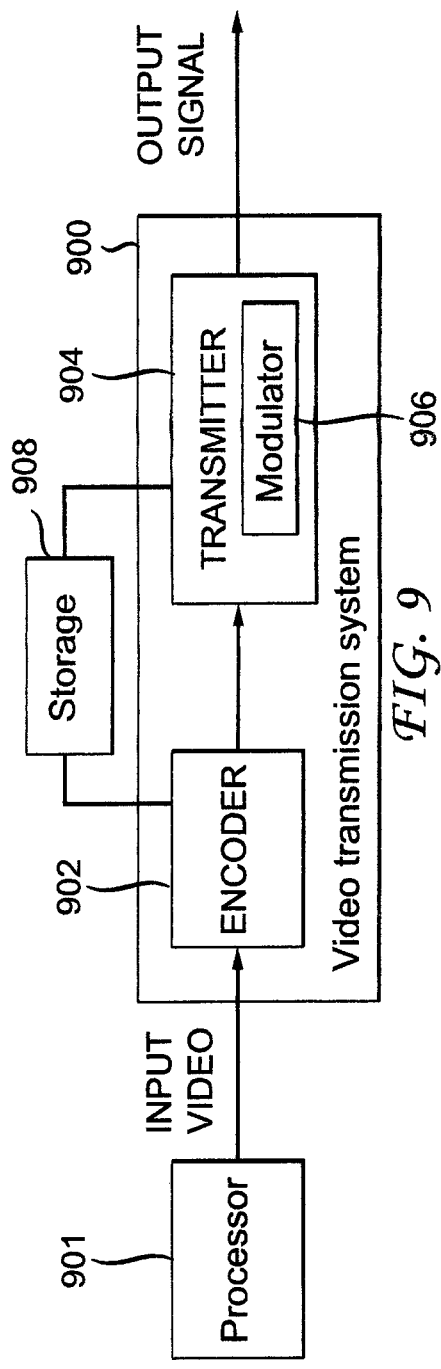
FIG. 9 is a block/flow diagram depicting an example of a transmission system that may be used with one or more implementations.

Referring now to FIG. 9, a video transmission system or apparatus 900 is shown, to which the features and principles described above may be applied. The video transmission system or apparatus 900 may be, for example, a head-end or transmission system for transmitting a signal using any of a variety of media, such as, for example, satellite, cable, telephone-line, or terrestrial broadcast. The video transmission system or apparatus 900 also, or alternatively, may be used, for example, to provide a signal for storage. The transmission may be provided over the Internet or some other network. The video transmission system or apparatus 900 is capable of generating and delivering, for example, video content and other content such as, for example, indicators of depth including, for example, depth and/or disparity values. It should also be clear that the blocks of FIG. 9 provide a flow diagram of a video transmission process, in addition to providing a block diagram of a video transmission system or apparatus.

The video transmission system or apparatus 900 receives input video from a processor 901. In one implementation, the processor 901 simply provides original-resolution images, such as the disparity images 821, 831, 841 and/or the video image 811, to the video transmission system or apparatus 900. However, in another implementation, the processor 901 is a processor configured for performing filtering and down-sampling, for example, as described above with respect to the operations 812, 822, 832, 842 to produce images such as the video image 813 and/or the disparity images 823, 833, 843. In yet another implementation, the processor 901 is configured for performing disparity conversion, such as, for example, the operation 850, to produce a disparity image with converted disparity values, such as, for example, the disparity image 860. The processor 901 may also provide metadata to the video transmission system or apparatus 900 indicating, for example, the horizontal resolution of an input image, the horizontal resolution upon which disparity values are based, whether disparity values are based on a percentage or a common multiple, and other information describing one or more of the input images.

The video transmission system or apparatus 900 includes an encoder 902 and a transmitter 904 capable of transmitting the encoded signal. The encoder 902 receives video information from the processor 901. The video information may include, for example, video images, and/or disparity (or depth) images. The encoder 902 generates an encoded signal(s) based on the video and/or disparity information. The encoder 902 may be, for example, an AVC encoder. The AVC encoder may be applied to both video and disparity information. AVC refers to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "H.264/MPEG-4 AVC Standard" or variations thereof, such as the "AVC standard", the "H.264 standard", or simply "AVC" or "H.264").

The encoder 902 may include sub-modules, including for example an assembly unit for receiving and assembling various pieces of information into a structured format for storage or transmission. The various pieces of information may include, for example, coded or uncoded video, coded or uncoded disparity (or depth) values, and coded or uncoded elements such as, for example, motion vectors, coding mode indicators, and syntax elements. In some implementations, the encoder 902 includes the processor 901 and therefore performs the operations of the processor 901.

The transmitter 904 receives the encoded signal(s) from the encoder 902 and transmits the encoded signal(s) in one or more output signals. The transmitter 904 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 906. The transmitter 904 may include, or interface with, an antenna (not shown). Further, implementations of the transmitter 904 may be limited to the modulator 906.

The video transmission system or apparatus 900 is also communicatively coupled to a storage unit 908. In one implementation, the storage unit 908 is coupled to the encoder 902, and is the storage unit 908 stores an encoded bitstream from the encoder 902. In another implementation, the storage unit 908 is coupled to the transmitter 904, and stores a bitstream from the transmitter 904. The bitstream from the transmitter 904 may include, for example, one or more encoded bitstreams that have been further processed by the transmitter 904. The storage unit 908 is, in different implementations, one or more of a standard DVD, a Blu-Ray disc, a hard drive, or some other storage device.

Figure 10:
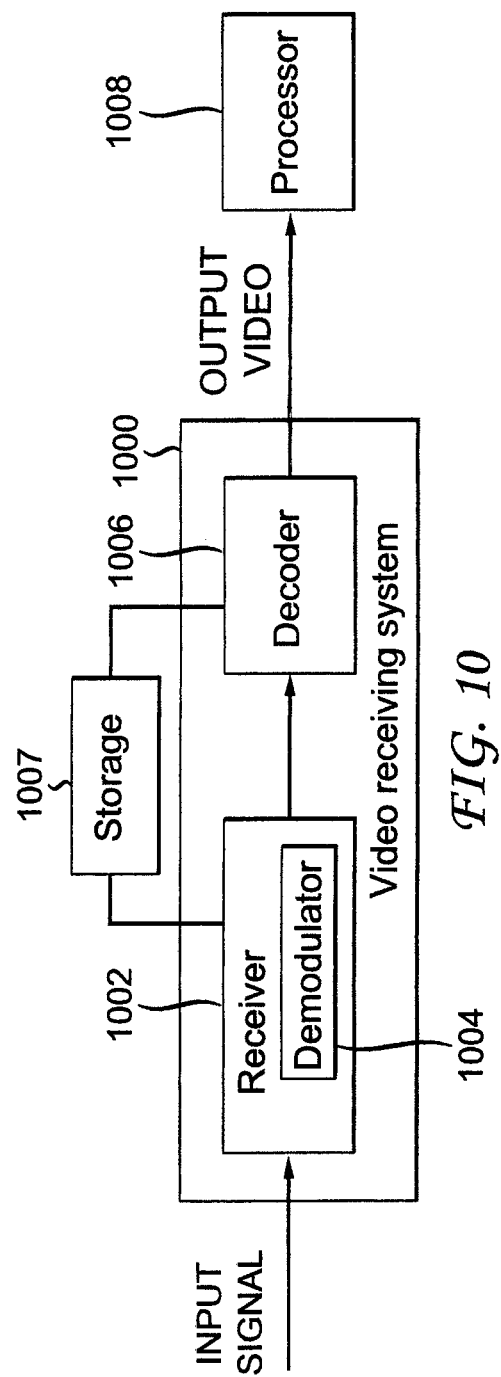
FIG. 10 is a block/flow diagram depicting an example of a receiving system that may be used with one or more implementations.

Referring now to FIG. 10, a video receiving system or apparatus 1000 is shown to which the features and principles described above may be applied. The video receiving system or apparatus 1000 may be configured to receive signals over a variety of media, such as, for example, satellite, cable, telephone-line, or terrestrial broadcast. The signals may be received over the Internet or some other network. It should also be clear that the blocks of FIG. 10 provide a flow diagram of a video receiving process, in addition to providing a block diagram of a video receiving system or apparatus.

The video receiving system or apparatus 1000 may be, for example, a cell-phone, a computer, a set-top box, a television, or other device that receives encoded video and provides, for example, decoded video signal for display (display to a user, for example), for processing, or for storage. Thus, the video receiving system or apparatus 1000 may provide its output to, for example, a screen of a television, a computer monitor, a computer (for storage, processing, or display), or some other storage, processing, or display device.

The video receiving system or apparatus 1000 is capable of receiving and processing video information, and the video information may include, for example, video images, and/or disparity (or depth) images. The video receiving system or apparatus 1000 includes a receiver 1002 for receiving an encoded signal, such as, for example, the signals described in the implementations of this application. The receiver 1002 may receive, for example, a signal providing one or more of the video image 815 and/or the disparity image 825, or a signal output from the video transmission system 900 of FIG. 9.

The receiver 1002 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 1004, de-randomizing the energy in the signal, de-interleaving the data in the signal, and error-correction decoding the signal. The receiver 1002 may include, or interface with, an antenna (not shown). Implementations of the receiver 1002 may be limited to the demodulator 1004.

The video receiving system or apparatus 1000 includes a decoder 1006. The receiver 1002 provides a received signal to the decoder 1006. The signal provided to the decoder 1006 by the receiver 1002 may include one or more encoded bitstreams. The decoder 1006 outputs a decoded signal, such as, for example, decoded video signals including video information. The decoder 1006 may be, for example, an AVC decoder.

The video receiving system or apparatus 1000 is also communicatively coupled to a storage unit 1007. In one implementation, the storage unit 1007 is coupled to the receiver 1002, and the receiver 1002 accesses a bitstream from the storage unit 1007. In another implementation, the storage unit 1007 is coupled to the decoder 1006, and the decoder 1006 accesses a bitstream from the storage unit 1007. The bitstream accessed from the storage unit 1007 includes, in different implementations, one or more encoded bitstreams. The storage unit 1007 is, in different implementations, one or more of a standard DVD, a Blu-Ray disc, a hard drive, or some other storage device.

The output video from the decoder 1006 is provided, in one implementation, to a processor 1008. The processor 1008 is, in one implementation, a processor configured for performing upsampling such as that described, for example, with respect to upsampling operations 816 and/or 826. In some implementations, the decoder 1006 includes the processor 1008 and therefore performs the operations of the processor 1008. In other implementations, the processor 1008 is part of a downstream device such as, for example, a set-top box or a television.

Note that at least one implementation uses an extra bit to allow for 2 disparity maps to be generated. A first disparity map is computed with respect to a "left" view, and a second disparity map is computed with respect to a "right" view. Given that objects may be occluded, having two disparity maps allows for improved handling of occlusions. For example, by comparing the corresponding disparity values, a system can determine whether an occlusion exists, and if so, then take steps to fill the resulting hole. Additional implementations provide more disparity maps, and allocate an appropriate number of bits to accommodate the number of disparity maps. For example, in a multi-view context, such as for example MVC (which refers to AVC with the MVC extension (Annex G)), it may be desirable to transmit a set of disparity maps showing the calculated disparity from every view to every other view. Alternatively, an implementation may only transmit disparity maps with respect to a subset of views.

Disparity may be calculated, for example, in a manner similar to calculating motion vectors. Alternatively, disparity may be calculated from depth values, as is known and described above.

Various implementations also have advantages resulting from the use of disparity values instead of depth values. Such advantages may include: (1) disparity values are bounded, whereas depth values may go to infinity and so depth values are harder to represent/encode, (2) disparity values can be represented directly, whereas a logarithmic scaling is often needed to represent the potentially very large depth values. Additionally, it is generally simple to determine depth from the disparity. Metadata is included in various implementations to provide information such as focal length, baseline distance (length), and convergence plane distance. Convergence plane distance is the distance at which the camera axes intersect when the cameras are converging. The point at which camera axes intersect can be seen in FIG. 4 as the vertex of the angle 410. When the cameras are parallel, the convergence plane distance is at infinite distance.

We thus provide one or more implementations having particular features and aspects. In particular, we provide several implementations relating to dense disparity maps. Dense disparity maps may allow a variety of applications, such as, for example, a relatively complex 3D effect adjustment on a consumer device, and a relatively simple sub-title placement in post-production. However, variations of these implementations and additional applications are contemplated and within our disclosure, and features and aspects of described implementations may be adapted for other implementations.

Note that the range of +80 to −150 pixels, for one or more particular display sizes, is used in at least one of the above implementations. However, in other implementations, even for those particular display sizes, a different disparity range is used that varies the end values of the range and/or the size of the range itself. In one implementation, a presentation in a theme park uses a more severe negative disparity (for example, to portray objects coming closer than half-way out from the screen) for more dramatic effects. In another implementation, a professional device supports a wider range of disparity than a consumer device.

Several of the implementations and features described in this application may be used in the context of the AVC Standard, and/or AVC with the MVC extension (Annex H), and/or AVC with the SVC extension (Annex G). Additionally, these implementations and features may be used in the context of another standard (existing or future), or in a context that does not involve a standard.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

It is understood that a given display may support multiple different resolutions. Therefore, the given display may be able to display video content having a resolution of, for example, either 1280, 1440, or 1920. Nonetheless, the given display is often referred to as a 1920 display because the highest supported resolution is 1920. When a large display is displaying a small resolution image, the individual elements of the image may comprise multiple pixels. For example, if a display can support a horizontal resolution of 800 and 1920, then the display is typically at least 1920 pixels wide. When the display is displaying an 800 resolution image it is possible that the display allocates at least a portion of three or more pixels to each element of the image.

Various implementations use floating point representations of disparity values. Particular variations of such implementations use fixed point representations of the disparity values instead of floating point representations.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, many implementations may be implemented in one or more of an encoder (for example, the encoder 902), a decoder (for example, the decoder 1006), a post-processor (for example, the processor 1008) processing output from a decoder, or a pre-processor (for example, the processor 901) providing input to an encoder. Further, other implementations are contemplated by this disclosure.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device.

Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, depth or disparity processing, and other processing of images and related depth and/or disparity maps. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   accessing a disparity value for a particular location in a picture, the picture being for display on a display device supporting a first horizontal resolution of a plurality of resolutions comprising at least two resolutions among 960, 1280, 1920, 2048 and/or 4096 pixels, the disparity value being adapted to a second horizontal resolution that is a common multiple of said plurality of resolutions, said second resolution being larger than any resolution of said plurality and being an integer that is convertible to one or more of said multiple resolutions supported by the display device;
   producing a modified disparity value by scaling down the accessed disparity value so that the modified disparity value is adapted to the first horizontal resolution; and
   processing the picture using the modified disparity value for displaying said picture on the display device.

2. The method of claim 1 wherein the producing comprises scaling the accessed disparity value by a factor that is based on the plurality.

3. The method of claim 1 wherein the producing comprises scaling the accessed disparity value based on the common multiple of the resolutions of said plurality.

4. The method of claim 3 wherein the common multiple is the smallest common multiple of the resolutions of said plurality.

5. The method of claim 3 wherein the common multiple is 11,520.

6. The method of claim 1 wherein the modified disparity value is an integer.

7. The method of claim 6 wherein the modified disparity value provides sub-pixel accuracy in disparity for the resolutions of said plurality.

8. The method of claim 7 wherein the modified disparity value provides accuracy in disparity that is more accurate than ¼ pixel.

9. An apparatus comprising one or more processors collectively configured to perform:
   accessing a disparity value for a particular location in a picture, the picture being for display on a display device supporting a first horizontal resolution of a plurality of resolutions comprising at least two resolutions among 960, 1280, 1920, 2048 and/or 4096 pixels, the disparity value being adapted to a second horizontal resolution that is a common multiple of said plurality of resolutions, said second resolution being larger than any resolution of said plurality and being an integer that is convertible to one or more of said multiple resolutions supported by the display device;

producing a modified disparity value by scaling down the accessed disparity value so that the modified disparity value is adapted to the first horizontal resolution; and processing the picture using the modified disparity value for displaying said picture on the display device.

10. The apparatus of claim 9 further comprising a memory for storing the modified disparity value.

11. A non-transitory processor readable medium having stored thereon instructions for causing one or more processors to collectively perform:

accessing a disparity value for a particular location in a picture, the picture being for display on a display device supporting a first horizontal resolution of a plurality of resolutions comprising at least two resolutions among 960, 1280, 1920, 2048, and/or 4096 pixels, the disparity value being adapted to a second horizontal resolution that is a common multiple of said plurality of resolutions, said second resolution being larger than any resolution of said plurality and being an integer that is convertible to one or more of said multiple resolutions supported by the display device;

producing a modified disparity value by scaling down the accessed disparity value so that the modified disparity value is adapted to the first horizontal resolution; and processing the picture using the modified disparity value for displaying said picture on the display device.

\* \* \* \* \*